United States Patent
Kitamura et al.

(10) Patent No.: US 12,240,631 B2
(45) Date of Patent: Mar. 4, 2025

(54) ORBITAL ATTITUDE CONTROL DEVICE, SATELLITE, ORBITAL ATTITUDE CONTROL METHOD, AND RECORDING MEDIUM

(71) Applicant: Mitsubishi Electric Corporation, Tokyo (JP)

(72) Inventors: Kenji Kitamura, Tokyo (JP); Takeya Shima, Tokyo (JP); Katsuhiko Yamada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 210 days.

(21) Appl. No.: 17/791,903

(22) PCT Filed: Feb. 26, 2020

(86) PCT No.: PCT/JP2020/007653
§ 371 (c)(1),
(2) Date: Jul. 11, 2022

(87) PCT Pub. No.: WO2021/171409
PCT Pub. Date: Sep. 2, 2021

(65) Prior Publication Data
US 2022/0402633 A1    Dec. 22, 2022

(51) Int. Cl.
 *B64G 1/24* (2006.01)
 *B64G 1/26* (2006.01)
 *B64G 1/36* (2006.01)

(52) U.S. Cl.
CPC .............. *B64G 1/244* (2019.05); *B64G 1/26* (2013.01); *B64G 1/363* (2013.01); *B64G 1/245* (2023.08)

(58) Field of Classification Search
CPC . B64G 1/244; B64G 1/24; B64G 1/00; B64G 1/40; B64G 1/26; B64G 1/363;
(Continued)

(56) References Cited

U.S. PATENT DOCUMENTS 3,866,025 A * 2/1975 Cavanagh ............... B64G 1/26
 701/13
4,767,084 A * 8/1988 Chan ...................... B64G 1/244
 244/164
(Continued)

FOREIGN PATENT DOCUMENTS

JP    2001-1999 A    1/2001
JP    2001-18899 A   1/2001

OTHER PUBLICATIONS

Extended European Search Report issued Mar. 9, 2023, in the corresponding EP Patent Application No. 20921241.4, 7 pages.
(Continued)

*Primary Examiner* — Assres H Woldemaryam
(74) *Attorney, Agent, or Firm* — XSENSUS LLP

(57) ABSTRACT

In an orbital attitude control device (1150), an ideal thrust axis direction calculator (1505) calculates an ideal thrust axis direction based on information of a predetermined orbit, an ideal attitude calculator (1506) calculates an ideal attitude of the satellite based on the ideal thrust axis direction and a solar direction, and a control torque calculator (1510) calculates an ideal control torque that makes the attitude of the satellite follow the ideal attitude and a torque restraint plane in which the solar direction is orthogonal to a rotational axis of the solar array panel, defines an evaluation function obtained by weighting a distance from the ideal control torque and a distance from the torque restraint plane and then summing the weighted distances, and calculates the control torque that allows the drive constraint to be satisfied and the evaluation function to be minimized.

20 Claims, 7 Drawing Sheets

(58) Field of Classification Search
CPC ........ B64G 1/245; B64G 1/2427; B64G 1/36; B64G 1/405; B64G 1/443; B64G 1/242
See application file for complete search history.

(56) References Cited

U.S. PATENT DOCUMENTS

| | | | | | |
|---|---|---|---|---|---|
| 5,349,532 | A | * | 9/1994 | Tilley | B64G 1/26 701/13 |
| 5,452,869 | A | * | 9/1995 | Basuthakur | B64G 1/369 701/13 |
| 6,015,116 | A | * | 1/2000 | Anzel | B64G 1/244 244/158.6 |
| 6,042,058 | A | * | 3/2000 | Anzel | B64G 1/28 701/13 |
| 6,186,446 | B1 | * | 2/2001 | Tilley | B64G 1/44 244/171.1 |
| 6,296,207 | B1 | * | 10/2001 | Tilley | B64G 1/262 244/165 |
| 6,435,457 | B1 | * | 8/2002 | Anzel | B64G 1/26 244/171.1 |
| 6,439,507 | B1 | * | 8/2002 | Reckdahl | B64G 1/244 244/158.8 |
| 7,113,851 | B1 | | 9/2006 | Gelon et al. | |
| 7,918,420 | B2 | * | 4/2011 | Ho | B64G 1/26 244/158.8 |
| 8,352,101 | B2 | * | 1/2013 | Thomas | B64G 1/26 701/13 |
| 9,764,858 | B2 | * | 9/2017 | Weiss | B64G 1/242 |
| 10,967,991 | B2 | * | 4/2021 | Weiss | B64G 1/26 |
| 2005/0080522 | A1 | * | 4/2005 | Hamamatsu | B63H 25/42 701/3 |
| 2006/0065788 | A1 | * | 3/2006 | Tsao | B64G 1/36 244/171 |
| 2008/0315039 | A1 | * | 12/2008 | Rudd | B64G 1/244 244/164 |
| 2009/0218449 | A1 | * | 9/2009 | Kamiya | B64G 1/283 244/164 |
| 2010/0193641 | A1 | * | 8/2010 | Liu | B64G 1/26 244/165 |
| 2014/0214373 | A1 | * | 7/2014 | Jardin | G06T 11/206 703/2 |
| 2019/0286168 | A1 | * | 9/2019 | Weiss | B64G 1/26 |
| 2021/0245901 | A1 | * | 8/2021 | Kitamura | B64G 1/244 |

OTHER PUBLICATIONS

International Search Report and Written Opinion mailed on Apr. 28, 2020, received for PCT Application PCT/JP2020/007653, filed on Feb. 26, 2020, 9 pages including English Translation.

Rigger et al., "The Optimization of Attitude Profiles for SMART-1: a Highly Constrained Problem (The Truth About Attitude)", 18th ISSFD, 2004, 6 pages.

Office Action issued on Nov. 5, 2024, in corresponding European patent Application No. 20921241.4, 6 pages.

* cited by examiner

ORBITAL ATTITUDE CONTROL DEVICE, SATELLITE, ORBITAL ATTITUDE CONTROL METHOD, AND RECORDING MEDIUM

CROSS-REFERENCE TO RELATED APPLICATION

The present application is based on PCT filing PCT/JP2020/007653, filed Feb. 26, 2020, the entire contents of which is incorporated herein by reference.

TECHNICAL FIELD

The present disclosure relates to an orbital attitude control device, a satellite, an orbital attitude control method, and a program.

BACKGROUND ART

Rocket insertion orbits, into which geostationary satellites are inserted by rockets, include, for example, a low earth orbit (LEO), a geostationary transfer orbit (GTO), and a supersynchronous orbit (SSO). These orbits have perigee altitudes lower than a geostationary orbit (GEO). Thus, after separation of a geostationary satellite from a rocket, the geostationary satellite needs to perform orbit transfer from the rocket insertion orbit to the geostationary orbit using the thruster mounted thereon.

The satellite heretofore uses a chemical thruster mounted thereon to perform the orbit transfer. High thrust generally produced by the chemical thruster can achieve, for example, one-week orbit transfer from GTO to GEO. However, with a low specific impulse and a low effective exhaust velocity, the chemical thruster suffers from enormous amounts of propellant consumption. Normally, ⅓ to ½ of satellite launch mass is made of propellant.

Recently, orbit transfer using an electric propulsion thruster has gained attention. The electric propulsion thruster includes, for example, an ion engine and a Hall thruster. Compared with the chemical thruster, the electric propulsion thruster has high efficiency since the specific impulse and the effective exhaust velocity are high. Thus, use of the electric propulsion thruster can achieve great reduction of the propellant consumption in the orbit transfer. However, since the thrust of the electric propulsion thruster is much lower than the thrust of the chemical thruster, the orbit transfer takes a very long time. For example, the normal orbit transfer time from GTO to GEO in a case of using the electric propulsion thruster is four months to six months.

In the orbit transfer by the electric propulsion thruster, continuous thruster injection is needed to reduce transfer time as much as possible. However, in a case where the satellite is located behind the earth and a solar array panel (SAP) cannot generate electric power, the thruster may stop working. The thruster may also stop working in an orbital section with a low control efficiency.

In the orbit transfer by the electric propulsion thruster, constant change of a thrust vector direction in an inertial system to a proper direction is needed to reduce propellant consumption and transfer time. Generally, the thrust vector direction is fixed in a satellite fixed coordinate system fixed to a satellite. For example, the thrust vector direction is aligned with a Z axis of the satellite fixed coordinate system. Thus, changing the satellite attitude itself is needed to change the thrust vector direction in the inertial system. An attitude control actuator mounted on the satellite is often used to control the attitude of the satellite. The attitude control actuator is, for example, a reaction wheel or a control moment gyroscope.

Since power consumption of the electric propulsion thruster is high, power generation efficiency of the solar array panel needs to be kept maximum to enable continuous firing of the thruster. To maximize the power generation efficiency, sunlight needs to be made perpendicularly incident on the solar array panel.

Generally, the solar array panel mounted on the satellite has a rotational degree of freedom around an axis extending from the satellite body defined as a rotational axis. This rotational axis is aligned with, for example, a Y axis of the satellite fixed coordinate system. Thus, with the satellite controlled to have an attitude such that this rotational axis is perpendicular to the solar direction, which is a direction from the satellite toward the sun, sunlight can be made perpendicularly incident on an incidence surface of the solar array panel, thereby enabling the power generation efficiency to be maximized.

Thus the attitude of the satellite is to be controlled such that the Z axis of the satellite fixed coordinate system is directed in the proper thrust direction and the Y axis of the satellite fixed coordinate system is perpendicular to the solar direction. However, an ideal attitude of the satellite that satisfies these conditions sometimes changes abruptly. This may cause a problem of decreased efficiency of orbit control because inability to control the attitude by the attitude control actuator to follow the ideal attitude causes deviation of the Z axis of the satellite fixed coordinate system from the proper thrust axis direction. This may also cause another problem in that loss of the perpendicular relationship between the Y axis of the satellite fixed coordinate system and the solar direction decreases the power generation efficiency of the SAP.

To address these problems, a proposal is made that an attitude schedule of the satellite that constantly satisfies the perpendicular relationship between the rotational axis of the solar array panel and the solar direction is made using a computer of the ground station and the attitude of the satellite is controlled based on the attitude schedule (for example, Patent Literature 1). In the electric propulsion system disclosed in Patent Literature 1, a satellite attitude schedule created using the computer of the ground station is transmitted from the ground station to the satellite. On the satellite side, attitude control to cause the attitude of the satellite to follow the received attitude schedule is performed by the attitude control actuator. Patent Literature 1 explains that this attitude control can generate maximum electric power while constantly prioritizing the optimum thrust vector direction.

Also, a specific method of deriving an attitude profile in attitude control using the electric propulsion thruster is proposed (for example, Non-Patent Literature 1). The method proposed in Non-Patent Literature 1 is a method of modifying an attitude angle around the thrust axis under conditions that satisfy a drive constraint of the attitude control actuator.

CITATION LIST

Patent Literature

Patent Literature 1: Unexamined Japanese Patent Application Publication No. 2001-18899

Non-Patent Literature

Non-Patent Literature 1: R. Rigger, J. Juul Yde, M. Mueller, V. Companys, "The Optimisation of Attitude Profiles for SMART-1: A Highly Constrained Problem (The Truth about Attitude)", 18th ISSFD, 2004

SUMMARY OF INVENTION

Technical Problem

The electric propulsion system disclosed in Patent Literature 1 calculates the attitude schedule of the satellite at the ground station and uploads the attitude schedule to the satellite, and thus there is a problem in that operational load on the ground station is heavy. Also, since the orbit transfer based on the attitude schedule created at the ground station has difficulties in following the ever-changing attitude of the satellite, autonomous orbit transfer of the satellite is desired. However, due to limited processing abilities of a computing machine mounted on the satellite, achieving autonomous control similar to the level of computation at the ground station is difficult.

The method of deriving the attitude profile disclosed in Non-Patent Literature 1 causes a problem in that modifying the attitude angle around the thrust axis would lose orthogonality between the rotational axis of the solar array panel and the solar direction, which reduces the power generation efficiency of the solar array panel.

In view of the above circumstances, an objective of the present disclosure is to provide an orbital attitude control device, a satellite, an orbital attitude control method, and a program that can achieve autonomous orbit transfer in a short time while keeping high power generation efficiency of the solar array panel.

Solution to Problem

To achieve the above objective, an orbital attitude control device of the present disclosure is an orbital attitude control device of a satellite including an attitude control actuator and a solar array panel having a rotational degree of freedom around an axis extending from the satellite defined as a rotational axis. The orbital attitude control device includes an attitude estimator to estimate an attitude of the satellite and output estimation attitude information, and a drive constraint setter to set a drive constraint of the satellite. The orbital attitude control device further includes an ideal thrust axis direction calculator to calculate an ideal thrust axis direction based on information of a predetermined orbit of the satellite, an ideal attitude calculator to calculate an ideal attitude of the satellite based on the ideal thrust axis direction and a solar direction and output ideal attitude information, and a control torque calculator to calculate a control torque to control the attitude control actuator based on the estimation attitude information, the solar direction, the drive constraint, and the ideal attitude information. The control torque calculator calculates an ideal control torque that makes the attitude of the satellite follow the ideal attitude and a torque restraint plane in which the solar direction is orthogonal to the rotational axis, defines an evaluation function obtained by weighting a distance from the ideal control torque and a distance from the torque restraint plane and then summing the weighted distances, and calculates the control torque that allows the drive constraint to be satisfied and the evaluation function to be minimized.

Advantageous Effects of Invention

According to the present disclosure, since the control torque is calculated using the evaluation function expressed by the distance from the ideal control torque that makes the attitude of the satellite follow the ideal attitude and the distance from the torque restraint plane in which the solar direction is orthogonal to the rotational axis, the attitude control by a computing machine mounted on the satellite can be achieved, and the autonomous orbit transfer can be achieved in a short time while keeping high power generation efficiency of the solar array panel.

DESCRIPTION OF EMBODIMENTS

Embodiment 1

Figure 1:
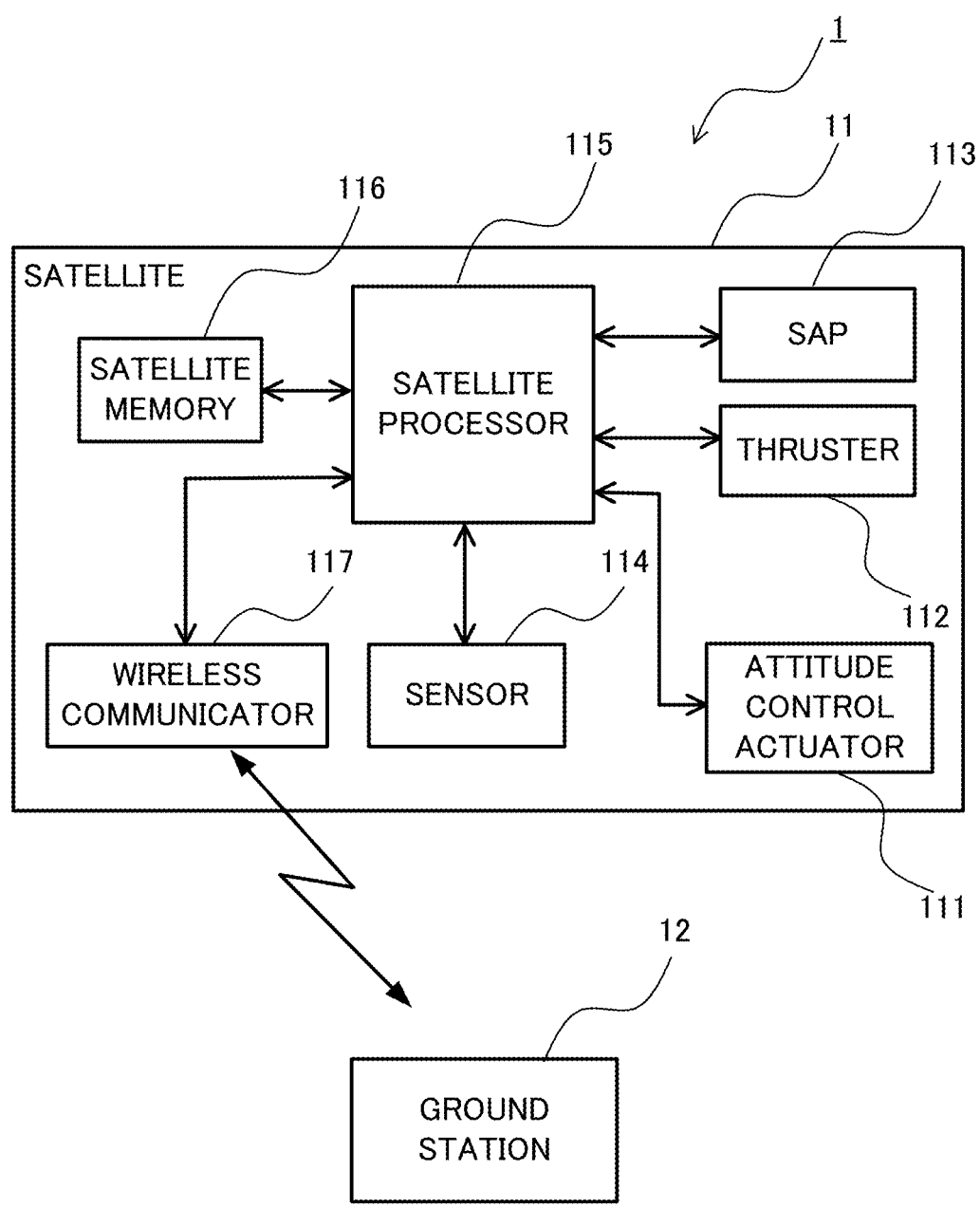
FIG. 1 is a block diagram illustrating a configuration of an orbital attitude control system according to Embodiment 1.

FIG. 1 illustrates a configuration of an orbital attitude control system 1 according to Embodiment 1 of the present disclosure. As illustrated in FIG. 1, the orbital attitude control system 1 according to the present embodiment includes a satellite 11 and a ground station 12 that wirelessly communicate with each other.

Figure 2:
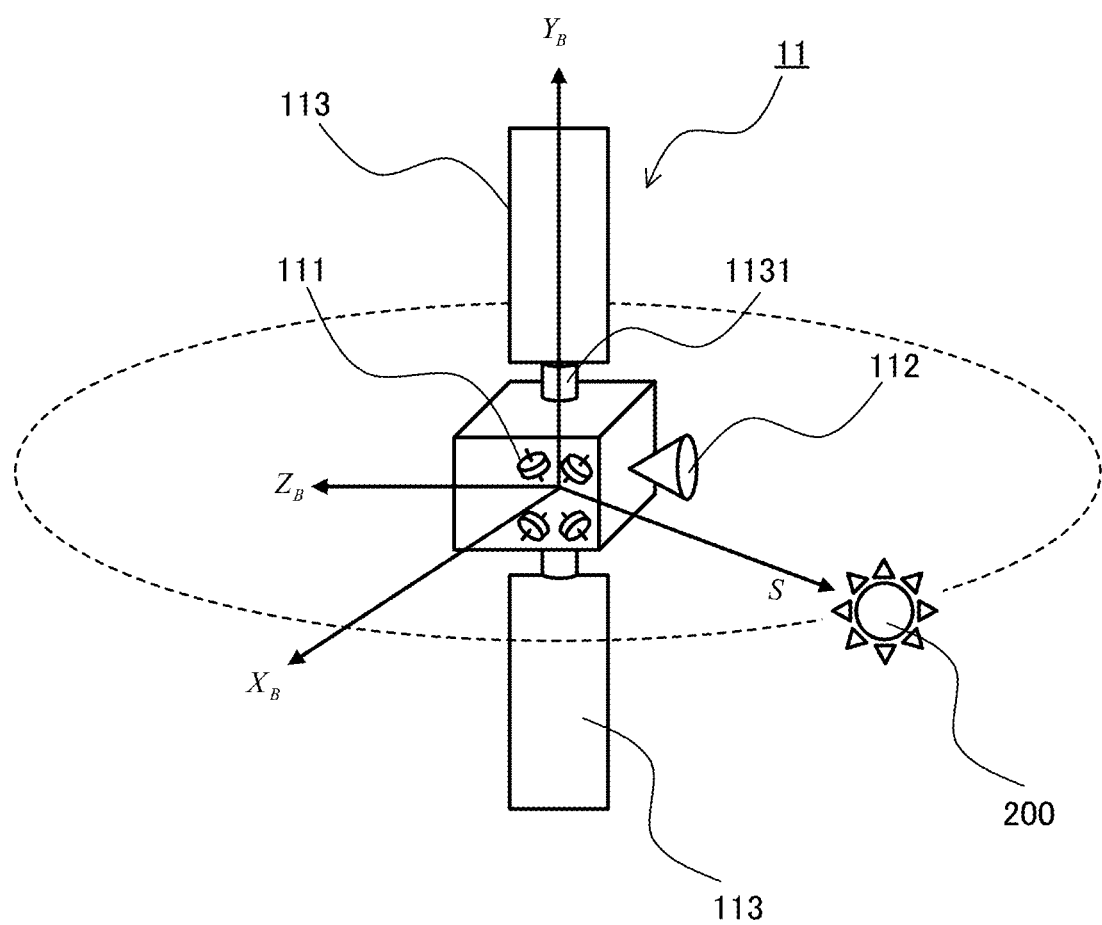
FIG. 2 is a schematic diagram illustrating a configuration of a satellite.

FIG. 2 is a schematic diagram illustrating a configuration of the satellite 11. As illustrated in FIGS. 1 and 2, the satellite 11 includes an attitude control actuator 111 that controls an attitude of the satellite 11, a thruster 112 that provides thrust to the satellite 11, a solar array panel (SAP) 113, and a sensor 114 that detects various types of information including an attitude angle and attitude angular velocity of the satellite 11 and a solar direction. The satellite 11 also includes a satellite processor 115, a satellite memory 116, and a wireless communicator 117 that transmits and receives information to and from the ground station 12.

The attitude control actuator 111 is a device that changes the attitude of the satellite 11 by applying torque to the satellite 11. Examples of the attitude control actuator 111 include a reaction wheel and a control moment gyroscope (CMG). The attitude control actuator 111 performs attitude control by reaction torque acting on the satellite 11 when wheels as illustrated in FIG. 2 are each rotated.

The thruster 112 is fixed to the satellite 11 and provides thrust to the satellite 11 by firing of the thruster 112. In the present embodiment, as illustrated in FIG. 2, a thrust direction of the thruster 112 is defined as $Z_B$ in a satellite fixed coordinate system fixed to the satellite. That is, the thruster 112 is fixed to the satellite 11, with a nozzle of the thruster 112 directed in a direction parallel to $Z_B$.

Although the thrust direction, which is a direction of thrust acting on the satellite 11 by the thruster 112, is a constant direction $Z_B$ in the satellite fixed coordinate system, the thrust direction changes in an inertial system in accompaniment with attitude movement of the satellite 11. Embodiment 1 describes a case where the thruster 112 is an electric propulsion thruster that is driven by electric power generated by the solar array panel 113.

The solar array panel 113 is a panel-like arrangement of solar cells that convert energy of sunlight to electric power. The satellite 11 includes a rotary mechanism 1131 having a rotational degree of freedom around $Y_B$ in the satellite fixed coordinate system defined as a rotational axis. The solar array panel 113 is mounted on the satellite 11 through this rotary mechanism 1131.

The solar array panel 113 can change orientation of a panel surface by rotating around the rotational axis $Y_B$. The highest power generation efficiency can be obtained when the panel surface of the solar array panel 113 extends perpendicularly to the solar direction S that is directed from the satellite 11 toward the sun 200. That is, the power generation efficiency is maximized when a normal direction of the panel surface of the solar array panel 113 is parallel to the solar direction S.

The sensor 114 includes an attitude angle sensor and an attitude angular velocity sensor. Types of sensors included in the sensor 114 may be any conventional types of sensors, and may use, for example, an earth sensor as the attitude angular sensor and a gyroscope as the attitude angular velocity sensor. The sensor 114 may include a sun sensor that detects a direction of the sun.

Figure 3:
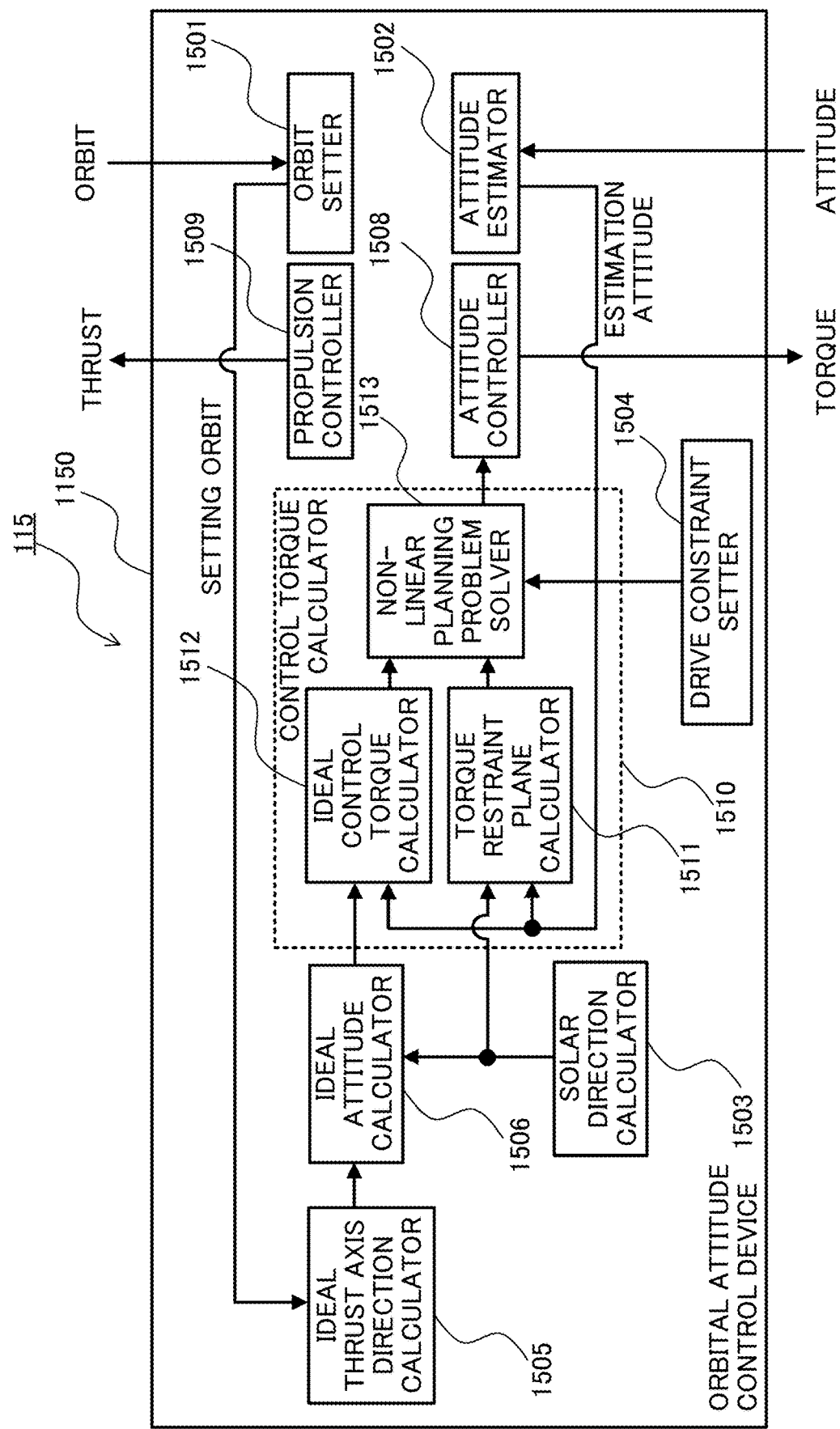
FIG. 3 is a functional block diagram of the orbital attitude control device according to Embodiment 1.

The satellite processor 115 is a central processing unit (CPU) or any other processing unit, and functions as the orbital attitude control device 1150 by reading and executing a program stored in the satellite memory 116. As illustrated in FIG. 3, the orbital attitude control device 1150 functions as each of functional units of an orbit setter 1501, an attitude estimator 1502, a solar direction calculator 1503, a drive constraint setter 1504, an ideal thrust axis direction calculator 1505, an ideal attitude calculator 1506, an attitude controller 1508, a propulsion controller 1509, and a control torque calculator 1510. The control torque calculator 1510 includes a torque restraint plane calculator 1511, an ideal control torque calculator 1512, and a non-linear programming problem solver 1513.

The orbit setter 1501 acquires from the satellite memory 116 information of the orbit of the satellite 11 in the inertial system, and sets the setting orbit. The orbit information includes information of an obit to which the satellite 11 is to transfer, and may be expressed with orbital elements or expressed with position and velocity in an orthogonal coordinate system. The orbit information stored in the satellite memory 116 may be information acquired from the ground station via the wireless communicator 117.

The attitude estimator 1502 estimates the attitude angle and the attitude angular velocity of the satellite 11 based on outputs of the attitude angle sensor and the attitude angular velocity sensor of the sensor 114, and outputs estimation attitude information including an estimation attitude angle and an estimation attitude angular velocity.

The solar direction calculator 1503 calculates the solar direction S that is directed from the satellite 11 toward the sun 200. The solar direction calculator 1503 calculates the solar direction S from an astronomical ephemeris and a current time previously stored in the satellite memory 116, or calculates the solar direction S from outputs of the sun sensor included in the sensor 114.

The drive constraint setter 1504 sets a drive constraint of the satellite 11 defined by capabilities of the attitude control actuator 111. The drive constraint includes an angular momentum constraint and a torque constraint.

The ideal thrust axis direction calculator 1505 calculates, from the setting orbit of the satellite 11 set by the orbit setter 1501, an ideal thrust axis direction that is an ideal thrust axis direction for minimizing orbit transfer time or minimizing propellant consumption and an ideal thrust axis direction time rate of change that is a time rate of change in the ideal thrust axis direction.

The ideal attitude calculator 1506 calculates an ideal attitude angle and an ideal attitude angular velocity of the satellite 11 based on the ideal thrust axis direction and the ideal thrust axis direction time rate of change calculated by the ideal thrust axis direction calculator 1505 and the solar direction calculated by the solar direction calculator 1503, and outputs ideal attitude information including the ideal attitude angle and the ideal attitude angular velocity. This ideal attitude angle is an angle of the attitude taken when the rotational axis of the solar array panel 113 is perpendicular to the solar direction and the thrust axis direction of the thruster 112 is aligned with the ideal thrust axis direction.

The torque restraint plane calculator 1511 of the control torque calculator 1510 calculates a torque restraint plane from the estimation attitude angle and the estimation attitude angular velocity estimated by the attitude estimator 1502 and the solar direction calculated by the solar direction calculator 1503. This torque restraint plane means a plane that satisfies an orthogonality condition if a control torque exists on this plane.

The ideal control torque calculator 1512 calculates, from the ideal attitude angle, the ideal attitude angular velocity, the estimation attitude angle, and the estimation attitude angular velocity, an ideal control torque that can reduce an error between the current attitude and the ideal attitude.

The non-linear programming problem solver 1513 defines an evaluation function obtained by weighting two distances of a distance from the ideal control torque and a distance from the torque restraint plane and then summing the weighted distances, and calculates the control torque by solving a non-linear programming problem that allows the drive constraint to be satisfied and the evaluation function to be minimized.

The control torque calculated by the non-linear programming problem solver 1513 is output to the attitude controller 1508. The attitude controller 1508 controls rotation of the attitude control actuator 111 based on the input control torque. The rotation of the attitude control actuator 111 applies reaction torque to the satellite 11 to change the attitude of the satellite 11.

The propulsion controller 1509 controls propulsion of the thruster 112, which is an electric propulsion thruster.

Figure 4:
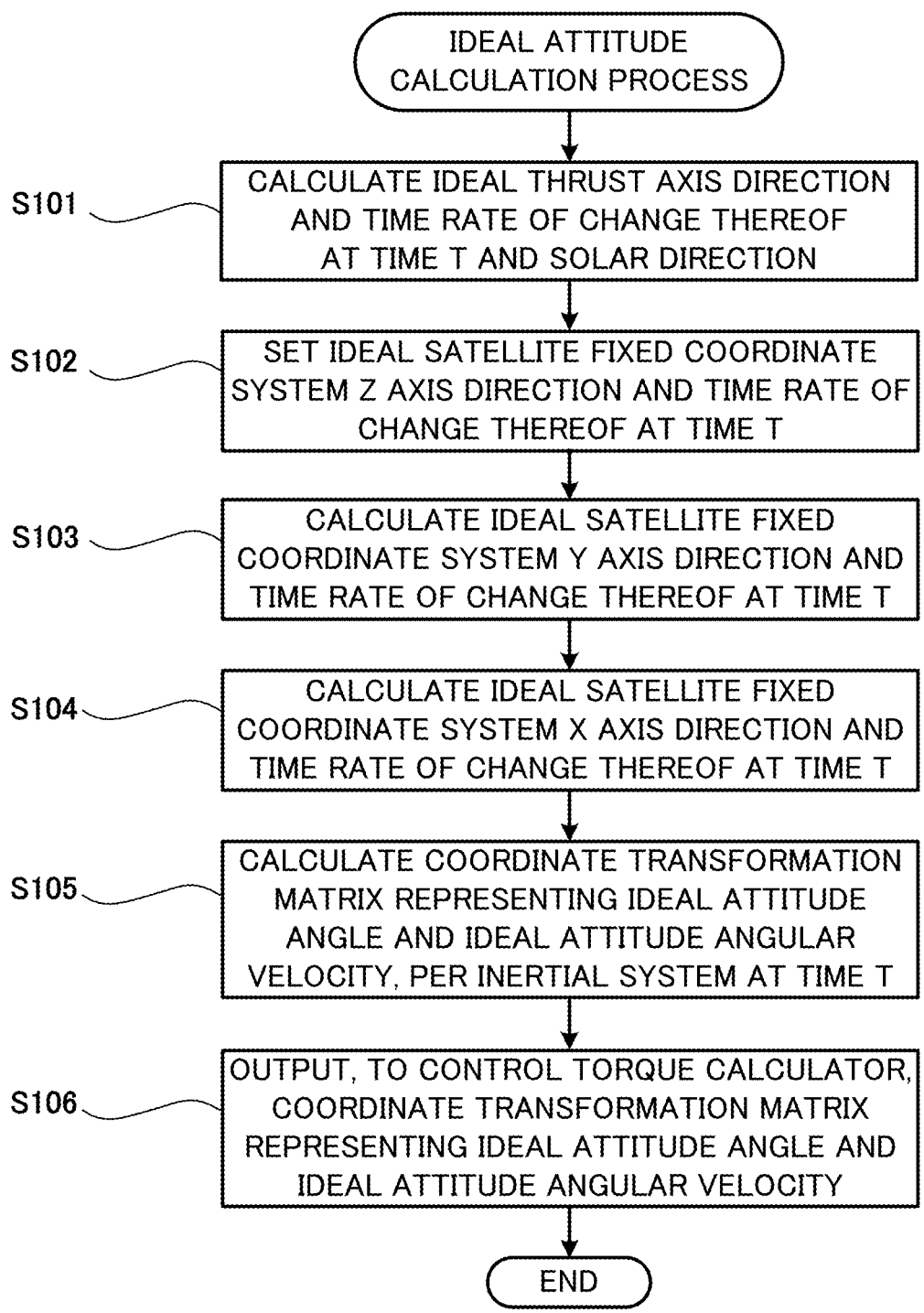
FIG. 4 is a flowchart illustrating an ideal attitude calculation process.

Operation of the orbital attitude control device 1150 as configured above is described. First, an ideal attitude calculation process executed by the satellite processor 115 is described with reference to a flowchart of FIG. 4.

First, the orbit setter 1501 acquires from the satellite memory 116 the information of the orbit of the satellite 11 in the inertial system, and sets the setting orbit. The ideal thrust axis direction calculator 1505 calculates, based on information of the setting orbit, the ideal thrust axis direction and the ideal thrust axis direction time rate of change for minimization of the orbit transfer time and the propellant consumption at time t. The solar direction calculator 1503 calculates the solar direction at time t (step S101).

Unit vectors of the solar direction, the ideal thrust axis direction, and the ideal thrust axis direction time rate of change at time t can be expressed as per Eq. (1).

[Eq. 1]

Unit vector of solar direction: $\hat{s}$

Unit vector parallel to ideal thrust axis direction: $\hat{u}^d$

Time rate of change of unit vector parallel to ideal thrust axis direction: $\dot{\hat{u}}^d$ (1)

Next, the ideal attitude calculator 1506 sets a $Z_B$ axis direction of the ideal satellite fixed coordinate system and a time rate of change thereof at time t (step S102). Since the thrust direction of the thruster 112 is parallel to the $Z_B$ axis direction of the satellite fixed coordinate system, the $Z_B$ axis direction of the satellite fixed coordinate system is ideally parallel to the ideal thrust axis direction. Thus, the ideal attitude calculator 1506 sets a unit vector parallel to the $Z_B$ axis direction of the satellite fixed coordinate system and the time rate of change thereof at time t as per Eq. (2).

[Eq. 2]

Unit vector parallel to $Z_B$: $\hat{z}_B^d = \hat{u}^d$

Time rate of change of unit vector parallel to $Z_B$:
$\dot{\hat{z}}_B^d = \dot{\hat{u}}^d$ (2)

The ideal attitude calculator 1506 calculates a $Y_B$ axis direction of the ideal satellite fixed coordinate system and a time rate of change thereof at time t (step S103). Since the rotational axis of the solar array panel 113 is parallel to the $Y_B$ axis direction of the satellite fixed coordinate system, the rotational axis of the solar array panel 113 is ideally perpendicular to the solar direction since the power generation efficiency of the solar array panel 113 is highest. Thus, a unit vector parallel to the $Y_B$ axis direction of the ideal satellite fixed coordinate system and the time rate of change thereof can be calculated by Eq. (3).

[Eq. 3]

Unit vector parallel to $Y_B$: $\hat{y}_B^d = \dfrac{\hat{z}_B^d \times \hat{s}}{|\hat{z}_B^d \times \hat{s}|}$ (3)

Time rate of change of unit vector parallel to $Y_B$: $\dot{\hat{y}}_B^d = \dfrac{d}{dt}\left(\dfrac{\hat{z}_B^d \times \hat{s}}{|\hat{z}_B^d \times \hat{s}|}\right)$ Since the ideal satellite fixed coordinate system is a right-handed orthogonal coordinate system, an $X_B$ axis direction of the ideal satellite fixed coordinate system and the time rate of change thereof can be calculated by Eq. (4) (step S104).

[Eq. 4]

Unit vector parallel to $X_B$: $\hat{x}_B^d = \hat{y}_B^d \times \hat{z}_B^d$

Time rate of change of unit vector parallel to $X_B$:
$\dot{\hat{x}}_B^d = \dot{\hat{y}}_B^d \times \hat{z}_B^d + \hat{y}_B^d \times \dot{\hat{z}}_B^d$ (4)

Next, the ideal attitude calculator 1506 calculates by Eq. (5) a coordinate transformation matrix representing an ideal attitude angle per an inertial system at time t from the unit vectors of the X, Y, and Z axis directions of the ideal satellite fixed coordinate system at time t calculated in steps S101, S102, and S103 (step S105). The ideal attitude calculator 1506 also calculates by Eq. (6) an ideal attitude angular velocity per the inertial system at time t from the unit vectors of the ideal X, Y, Z axis direction and the time rate of change thereof at time t (step S105). In Eqs. (5) and (6), $[\ ]_I$ represents a vector expressed in the inertial system and $[\ ]_B$ represents a vector expressed in the satellite fixed coordinate system.

[Eq. 5]

Coordinate transformation matrix (5)

representing ideal attitude angle: $C_{B^d I}$ $C_{B^d I} = [[\hat{x}_B^d]_I, [\hat{y}_B^d]_I, [\hat{z}_B^d]_I]$

[Eq. 6]

Ideal attitude angular velocity: $[\omega_{BI}^d]_B$ (6)

$[\omega_{BI}^d]_B = \begin{bmatrix} -[\hat{y}_B^d]_I^T [\dot{\hat{z}}_B^d]_I \\ +[\hat{x}_B^d]_I^T [\dot{\hat{z}}_B^d]_I \\ -[\hat{x}_B^d]_I^T [\dot{\hat{y}}_B^d]_I \end{bmatrix}$ The coordinate transformation matrix representing the ideal attitude angle per the inertial system at time t and the ideal attitude angular velocity per the inertial system calculated in step S105 are passed to the control torque calculator 1510, and then the ideal attitude calculation process ends.

Figure 5:
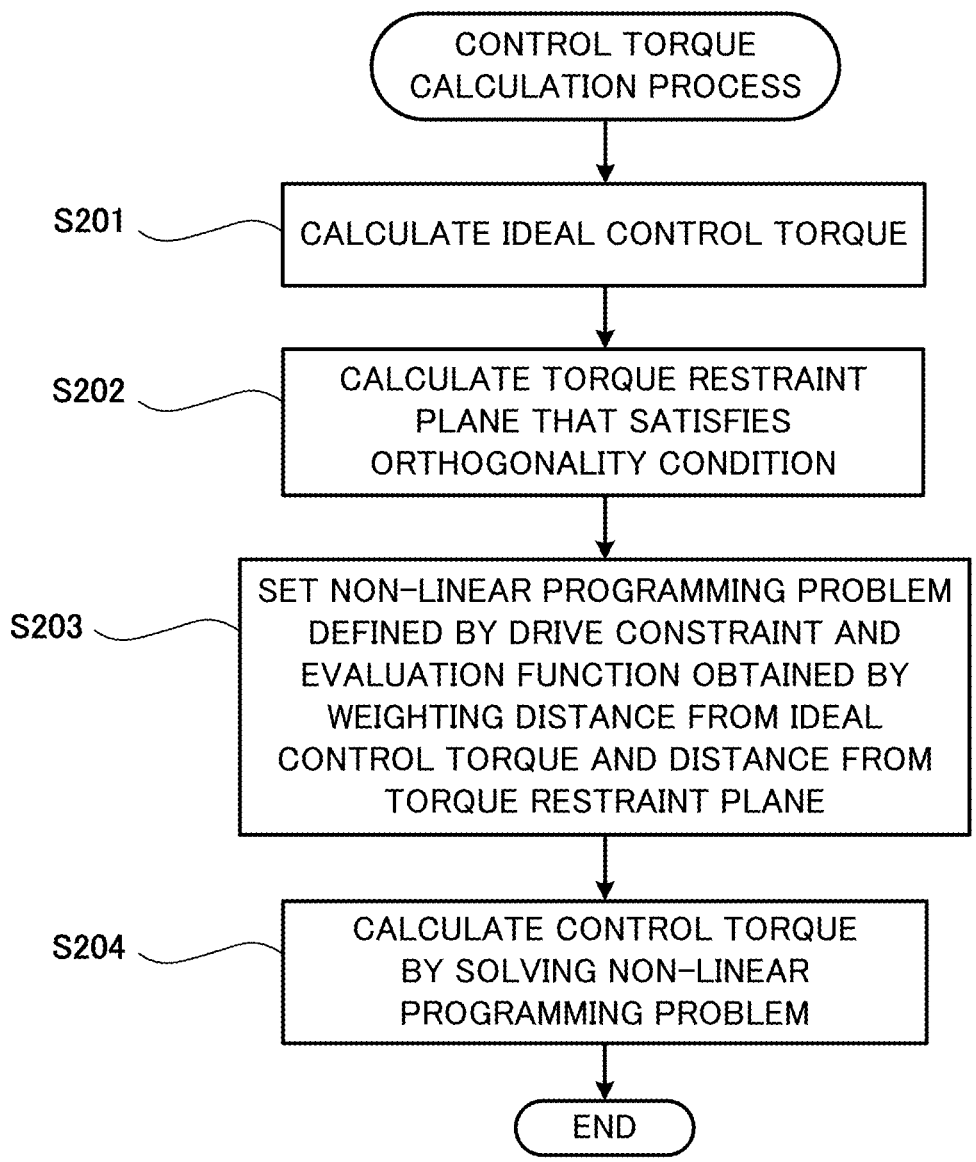
FIG. 5 is a flowchart illustrating a control torque calculation process.

Next, a control torque calculation process executed by the orbital attitude control device 1150 is described with reference to a flowchart of FIG. 5.

First, the ideal control torque calculator 1512 calculates an ideal control torque that reduces an error relative to the ideal attitude angle and the ideal attitude angular velocity calculated by the ideal attitude calculator 1506, by Eq. (7), which is a quaternion feedback equation (step S201).

[Eq. 7]

$[\tau^d]_B = k_p q_e - k_d [\omega_e]_B$ (7)

In Eq (7), $q_e$ is a vector part of an error quaternion representing an error of an actual attitude angle relative to the ideal attitude angle. Here, the actual attitude angle is the estimation attitude angle estimated by the attitude estimator 1502. $\omega_e$ is an error of an actual attitude angular velocity relative to the ideal attitude angular velocity. Here, the actual attitude angular velocity is the estimation attitude angular velocity estimated by the attitude estimator 1502. $k_p$ and $k_d$ are feedback gains.

Next, the torque restraint plane calculator 1511 calculates a torque restraint plane that satisfies an orthogonality condition (step S202). The torque restraint plane in which the control torque exists that can make an inner product of the Y axis direction of the satellite 11 and the solar direction asymptotic to 0 over time so as to satisfy the orthogonality condition is expressed by Eq. (8).

[Eq. 8]

$\hat{p}^T [\tau]_B + l = 0$ (8)

$\hat{p}$ . . . unit vector of normal direction to torque restraint plane $l$ . . . distance from origin to torque restraint plane Here, p and l of Eq. (8) expressing the torque restraint plane can be calculated using the solar direction, the attitude angle, the attitude angular velocity, and the satellite inertia matrix.

Next, the non-linear programming problem solver 1513 defines the evaluation function obtained by weighting two distances of the distance from the ideal control torque and the distance from the torque restraint plane and then summing the weighted distances, and sets the non-linear programming problem defined by this evaluation function and the drive constraint (step S203). By solving the set non-linear programming problem, the non-linear programming problem solver 1513 calculates the control torque that allows the evaluation function to be minimized while satisfying the drive constraint (step S204).

Step S203 and step S204 are described in detail. First, based on an allowance angular momentum $h_{max}$ and an allowance torque $\tau_{max}$ set by the drive constraint setter 1504, the angular momentum constraint equation is set as Eq. (9), and the torque constraint equation is set as Eq. (10).

[Eq. 9]

$$C_h(h,\tau,h_{max}) \leq 0 \tag{9}$$

[Eq. 10]

$$C_r(h,\tau,\tau_{max}) \leq 0 \tag{10}$$

Eqs. (9) and (10) are inequality constraints of a vector or a scalar. h is an angular momentum of the satellite 11 body, and can be found from the estimation attitude angular velocity and the satellite inertial matrix. $\tau$ is a control torque. Eq. (9) can be set as Eq. (11), and Eq. (10) can be set as Eq. (12). Here, $T_C$ is an operation period of the control torque calculator 1510.

[Eq. 11]

$$(h+T_C\tau)^T(h+T_C\tau)-h_{max}^2 \leq 0 \tag{11}$$

[Eq. 12]

$$\tau^T\tau-\tau_{max}^2 \leq 0 \tag{12}$$

Next, the non-linear programming problem solver 1513 defines the evaluation function J as per Eq. (13).

[Eq. 13]

$$J=d_1(\tau,\tau^d)+wd_2(\hat{p},l,\tau) \tag{13}$$

$d_1(\tau, \tau^d)$ . . . distance function of ideal control torque and control torque $d_2(\hat{p}, l, \tau)$ . . . distance function of torque restraint plane and control torque w . . . positive weight coefficient The evaluation function J can be defined, for example, as per Eq. (14).

[Eq. 14]

$$J=(\tau-\tau^d)^T(\tau-\tau^d)+w(\hat{p}^T\tau+l)^2 \tag{14}$$

The non-linear programming problem solver 1513 solves the non-linear programming problem defined by three Eqs. (9), (10), and (13), and passes the solution as the control torque to the attitude controller 1508. Here, in a case where these three equations are given as Eqs. (11), (12), and (14), this non-linear programming problem is a quadratic programming problem in which the restraint condition and the evaluation function are quadratic functions relating to torque, and the solution is given as a root of a biquadratic algebraic equation. The solution of the control torque can be calculated without iterative computation such as Newton's method.

The attitude controller 1508 controls the attitude of the satellite 11 by controlling rotation of the attitude control actuator 111 based on the control torque input from the control torque calculator 1510 so as to control the torque to be applied to the satellite 11.

As described above, according to the present embodiment, the ideal thrust axis direction calculator 1505 calculates the ideal thrust axis direction based on the setting orbit, the ideal attitude calculator 1506 calculates the ideal attitude of the satellite 11 based on the ideal thrust axis direction and the solar direction, and the control torque calculator 1510 calculates, based on the estimation attitude, the solar direction, the drive constraint, and the ideal attitude, the control torque to be added to the attitude control actuator 111. The control torque calculator 1510 calculates the ideal control torque that makes the attitude of the satellite follow the ideal attitude and the torque restraint plane in which the solar direction is orthogonal to the rotational axis of the solar array panel 113, defines the evaluation function obtained by weighting the distance from the ideal control torque and the distance from the torque restraint plane and then summing the weighted distances, and calculates the control torque that allows the drive constraint to be satisfied and the evaluation function to be minimized.

This enables calculation of the control torque for directing the thrust axis toward the proper direction constantly by the computing machine mounted on the satellite 11, while satisfying the constraint of the satellite 11 defined by capabilities of the attitude control actuator 111 and the condition of orthogonality between the rotational axis of the solar array panel 113 and the solar direction. Then, control of the attitude control actuator 111 using the calculated control torque can achieve reduction of time of the orbit transfer and the propellant consumption, while keeping the high power generation efficiency of the solar array panel 113 constant. Also, since the computation for attitude control of the present embodiment can be achieved by the computer mounted on the satellite 11, autonomous orbit transfer without involving the ground station 12 can be achieved.

Embodiment 2

Figure 6:
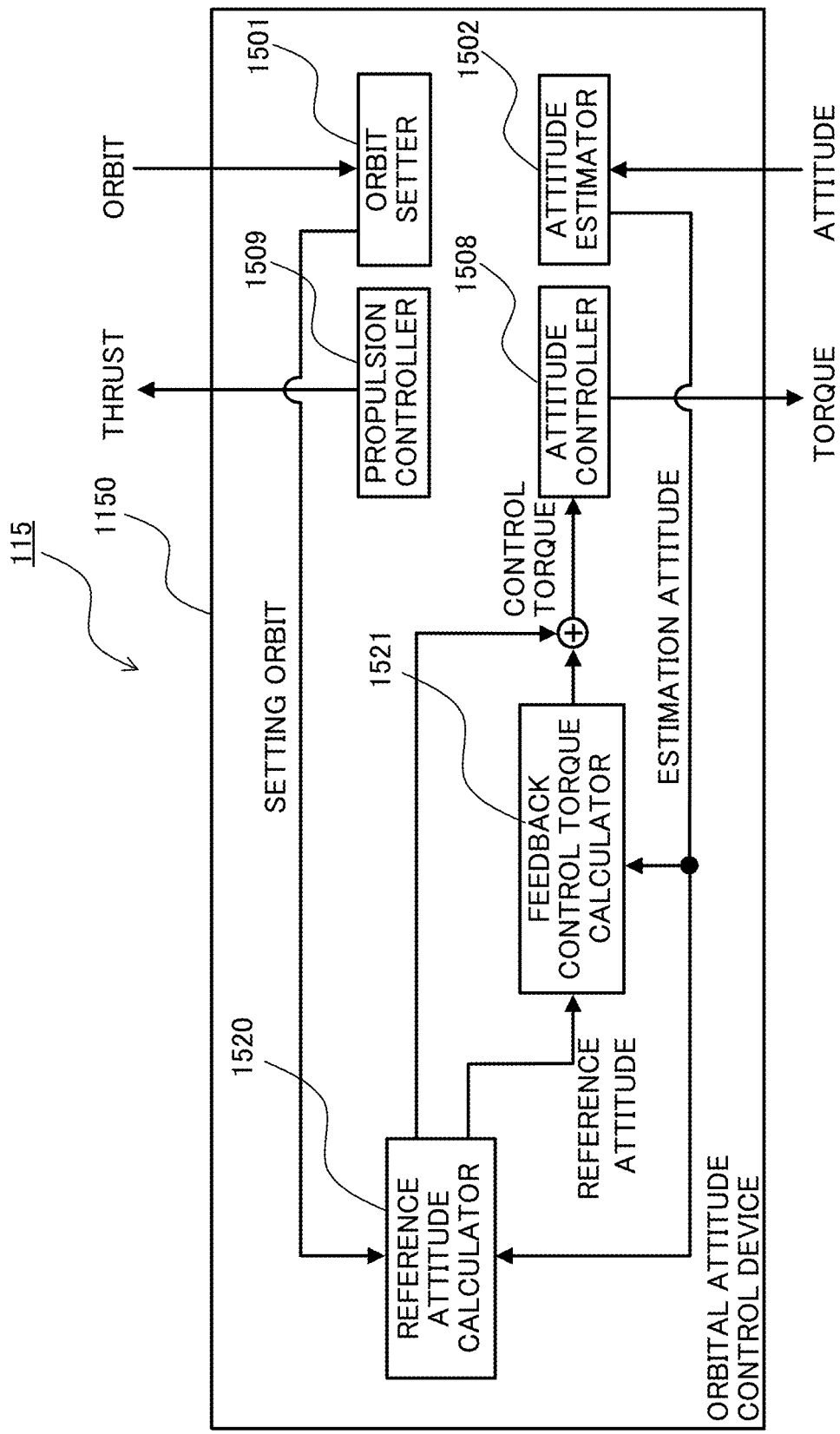
FIG. 6 is a functional block diagram of an orbital attitude control device according to Embodiment 2.

An orbital attitude control system 1 according to Embodiment 2 of the present disclosure has a hardware configuration similar to Embodiment 1 except that functions of the orbital attitude control device 1150 achieved by processing by the satellite processor 115 of the satellite 11 are partially different. FIG. 6 illustrates a functional block diagram of the orbital attitude control device 1150 according to Embodiment 2.

As illustrated in FIG. 6, the orbital attitude control device 1150 according to Embodiment 2 includes the orbit setter 1501, the attitude estimator 1502, the attitude controller 1508, the propulsion controller 1509, a reference attitude calculator 1520, and a feedback control torque calculator 1521. Functions and operations of the orbit setter 1501, the attitude estimator 1502, the attitude controller 1508, and the propulsion controller 1509 are similar to those of Embodiment 1.

The reference attitude calculator 1520 calculates, using the setting orbit, the estimation attitude angle, and the estimation attitude angular velocity of the satellite 11 at any time as inputs, a reference attitude angle, a reference attitude angular velocity, and a feedforward control torque from the current time to a future time.

Figure 7:
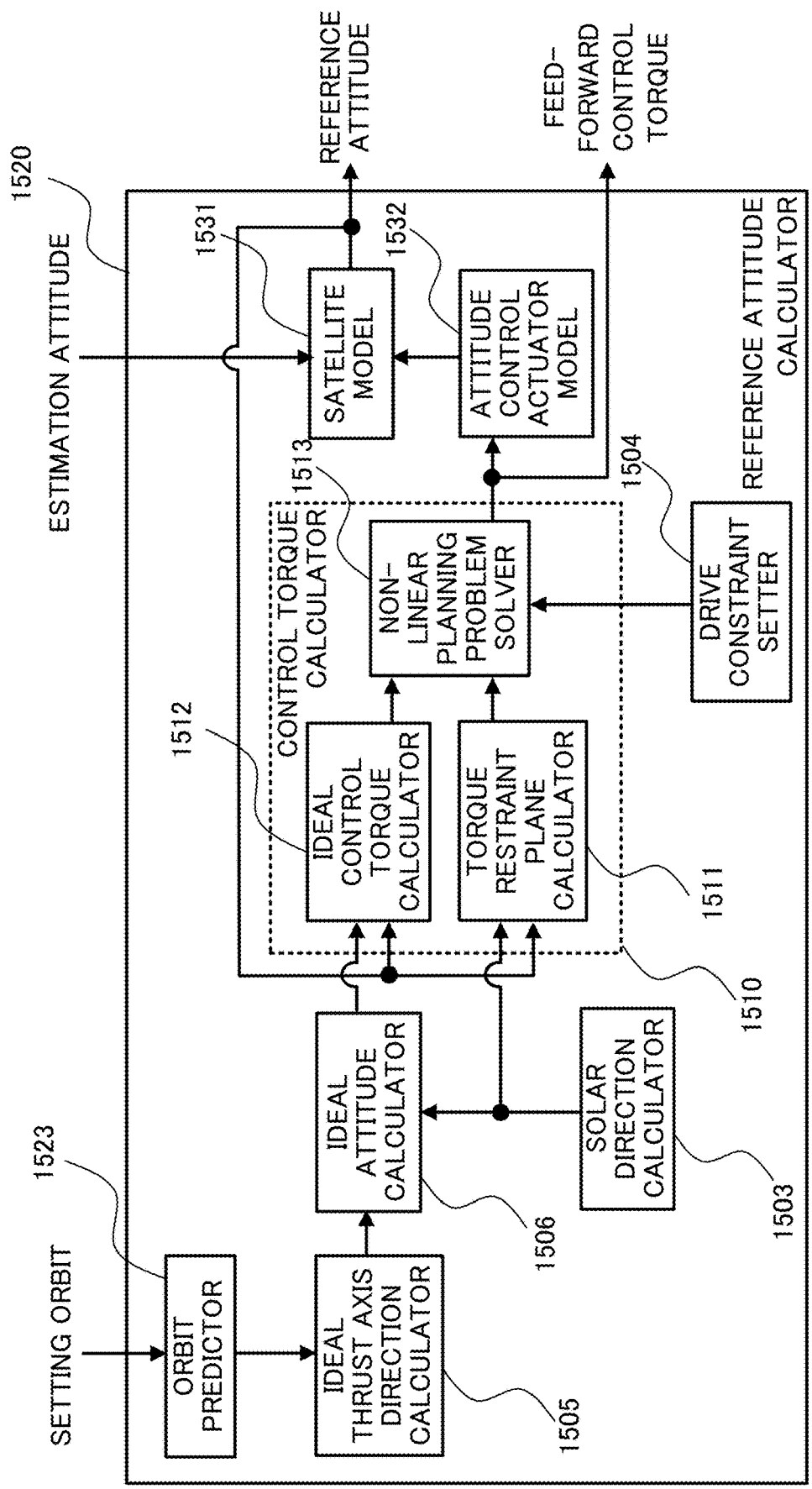
FIG. 7 is a functional block diagram of a reference attitude calculator.

The reference attitude calculator 1520 is described in detail with reference to FIG. 7. FIG. 7 is a functional block diagram of the reference attitude calculator 1520. As illustrated in FIG. 7, the reference attitude calculator 1520 includes a satellite model 1531 that is a mathematical model of the satellite 11 and an attitude control actuator model 1532 that is a mathematical model of the attitude control actuator 111. The satellite model 1531 and the attitude control actuator model 1532 simulate operations of the satellite 11 and the attitude control actuator 111, respectively.

The reference attitude calculator 1520 calculates the reference attitude and the feedforward control torque from a freely-selected time $t_1$ to a freely-selected future time $t_2$ by integrating the setting orbit, the estimation attitude angle, and the estimation attitude angular velocity with respect to time using the satellite model 1531.

The reference attitude calculator 1520 includes the solar direction calculator 1503, the drive constraint setter 1504, the ideal thrust axis direction calculator 1505, the ideal attitude calculator 1506, and the control torque calculator 1510 included in the orbital attitude control device 1150 of Embodiment 1. The functions and operations of the solar direction calculator 1503, the drive constraint setter 1504, the ideal thrust axis direction calculator 1505, the ideal attitude calculator 1506, and the control torque calculator 1510 are similar to those of Embodiment 1, except that an input to the ideal thrust axis direction calculator 1505 is the setting orbit in Embodiment 1, and a prediction orbit output by the orbit predictor 1523 in Embodiment 2. Thus, the output of the control torque calculator 1510 is a feedforward control torque from the freely-selected time $t_1$ to the freely-selected future time $t_2$.

The orbit predictor 1523 predicts the orbit of the satellite from the freely-selected time $t_1$ to the freely-selected future time $t_2$ based on the setting orbit at the freely-selected time $t_1$. Prediction of the orbit is made using a freely selected method, for example, a two-body problem approximation. The obtained prediction orbit is input to the ideal thrust axis direction calculator 1505.

The attitude control actuator model 1532 drives the actuator by rotation that can achieve the feedforward control torque output by the control torque calculator 1510, and adds the control torque to the satellite model 1531.

The satellite model 1531 finds information of the reference attitude including the reference attitude angle and the reference attitude angular velocity by integration with respect to time from the freely-selected time $t_1$ to the freely-selected future time $t_2$ concerning the attitude of the satellite model 1531 taken when the feedforward control torque is applied, using as initial values the estimation attitude angle and the estimation attitude angular velocity at the freely-selected time $t_1$.

The feedback control torque calculator 1521 calculates a feedback control torque for following the reference attitude angle and the reference attitude angular velocity from the reference attitude angle and the reference attitude angular velocity calculated by the reference attitude calculator 1520, the estimation attitude angle, and the estimation attitude angular velocity.

Information of the control torque including the feedforward control torque calculated by the reference attitude calculator 1520 and the feedback control torque calculated by the feedback control torque calculator 1521 is output to the attitude controller 1508. The attitude controller 1508 executes two degree of freedom control of feedforward control and feedback control based on the input information of the control torque, and controls the rotation of the attitude control actuator 111. This enables the attitude of the satellite 11 to follow the reference attitude.

As described above, according to the present embodiment, the control torque calculator 1510 included in the reference attitude calculator 1520 calculates the feedforward control torque of a freely-selected future time based on the prediction orbit and the estimation attitude information. The reference attitude calculator 1520 finds the reference attitude of the future time found by addition of the feedforward control torque to the satellite model 1531, and the feedback control torque calculator 1521 calculates the feedback control torque for making the attitude of the satellite 11 follow the reference attitude. Then the attitude controller 1508 executes two degree of freedom control that uses both of the feedforward control torque and the feedback control torque.

This enables the attitude of the satellite 11 to follow the reference attitude. In addition, since the reference attitude is an attitude that suppresses an error of the actual attitude relative to the ideal attitude while satisfying the orthogonality condition of the solar array panel 113 and the actuator drive constraint, the orbit transfer time and the propellant consumption can be reduced while keeping the power generation efficiency of the solar array panel 113 maximized constantly. Also, since the computation for attitude control of the present embodiment can be achieved by the computer mounted on the satellite 11, autonomous orbit transfer without involving the ground station 12 can be achieved.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

For example, although the above embodiments describes the satellite processor 115 achieving, based on the information of the orbit and the attitude, all the functions in a process until control values of the propulsion and the torque are calculated, all or a part of these functions may be achieved by hardware other than a processor. For example, all or a part of these functions may be achieved by a single circuit, a composite circuit, a processor in parallel programming environments, an application specific integrated circuit (ASIC), a field-programmable gate array (FPGA), or a combination thereof.

Executing a program of processing executed by the satellite processor 115 using an existing computer enables the information terminal to function as the orbital attitude control device 1150 of the satellite 11 according to the present disclosure.

A distribution method for such a program is freely selected. For example, the program may be distributed by being stored in a compact disc read-only memory (CD-ROM), a digital versatile disc (DVD), a magneto optical disc (MO), a memory card, or another computer-readable recording medium, or maybe distributed via the Internet or another communication network.

REFERENCE SIGNS LIST

1 Orbital attitude control system
11 Satellite
111 Attitude control actuator
112 Thruster
113 Solar array panel (SAP)
114 Sensor
115 Satellite processor
116 Satellite memory
117 Wireless communicator 12 Ground station
1131 Rotary mechanism
200 Sun
1150 Orbital attitude control device
1501 Orbit setter
1502 Attitude estimator
1503 Solar direction calculator
1504 Drive constraint setter
1505 Ideal thrust axis direction calculator
1506 Ideal attitude calculator
1508 Attitude controller
1509 Propulsion controller
1510 Control torque calculator
1511 Torque restraint plane calculator
1512 Ideal control torque calculator
1513 Non-linear programming problem solver
1520 Reference attitude calculator
1521 Feedback control torque calculator
1523 Orbit predictor
1531 Satellite model
1532 Attitude control actuator model

The invention claimed is:

1. An orbital attitude control device for orbital transfer toward a geostationary orbit of a satellite including an attitude control actuator and a solar array panel having a rotational degree of freedom around an axis extending from the satellite defined as a rotational axis, the orbital attitude control device comprising:
processing circuitry configured to:
estimate an attitude of the satellite and output estimation attitude information,
set a drive constraint of the satellite,
calculate an ideal thrust axis direction for the orbital transfer of the satellite toward the geostationary orbit based on information of a predetermined orbit of the satellite,
calculate an ideal attitude of the satellite based on the ideal thrust axis direction for the orbital transfer of the satellite toward the geostationary orbit and a solar direction and output ideal attitude information, and
calculate a control torque to control the attitude control actuator based on the estimation attitude information, the solar direction, the drive constraint, and the ideal attitude information, wherein
the processing circuitry is configured to, during the orbital transfer of the satellite toward the geostationary orbit:
calculate an ideal control torque that makes the attitude of the satellite follow the ideal attitude and a torque restraint plane in which the solar direction is orthogonal to the rotational axis,
define an evaluation function obtained by weighting a distance from the ideal control torque and a distance from the torque restraint plane and then summing the weighted distances, and
calculate the control torque that allows the drive constraint to be satisfied and the evaluation function to be minimized.

2. The orbital attitude control device according to claim 1, wherein the processing circuitry calculates the control torque by expressing each of the evaluation function and the drive constraint as a quadratic relating to the control torque, and solving a non-linear planning problem expressed by the quadratic.

3. The orbital attitude control device according to claim 1, wherein
the satellite further includes an electric propulsion thruster to be driven by electric power generated by the solar array panel, and
the processing circuitry controls propulsion of the electric propulsion thruster during the orbital transfer of the satellite toward the geostationary orbit.

4. The orbital attitude control device according to claim 1, wherein
the estimation attitude information includes an estimation attitude angle and an estimation attitude angular velocity, and
the ideal attitude information includes an ideal attitude angle and an ideal attitude angular velocity.

5. The orbital attitude control device according to claim 1, wherein the drive constraint includes a constraint of an angular momentum and a constraint of a torque of the attitude control actuator.

6. The orbital attitude control device according to claim 1, wherein
the processing circuitry calculates a feedforward control torque of a future time based on information of the orbit and the estimation attitude information, and
calculates a feedback control torque that makes the attitude of the satellite follow a reference attitude of the future time, the reference attitude being obtained by addition of the feedforward control torque to a model of the satellite, and
controls the attitude control actuator by 2 degrees of freedom control that uses both of the feedforward control torque and the feedback control torque.

7. A satellite comprising the orbital attitude control device according to claim 1.

8. An orbital attitude control method for orbital transfer toward a geostationary orbit for a satellite including a solar array panel and an attitude control actuator, the orbital attitude control method comprising:
calculating, during the orbital transfer of the satellite toward the geostationary orbit, an ideal thrust axis direction based on information of a predetermined orbit of the satellite;
calculating, during the orbital transfer of the satellite toward the geostationary orbit, an ideal attitude of the satellite based on the ideal thrust axis direction and a solar direction; and
calculating, during the orbital transfer of the satellite toward the geostationary orbit, a control torque to control the attitude control actuator based on an estimation attitude of the satellite, the solar direction, a drive constraint of the attitude control actuator, and the ideal attitude, wherein
the calculating of the control torque during the orbital transfer of the satellite toward the geostationary orbit includes calculating an ideal control torque that makes the attitude of the satellite follow the ideal attitude and a torque restraint plane in which the solar direction is orthogonal to a rotational axis of the solar array panel, defining an evaluation function obtained by weighting a distance from the ideal control torque and a distance from the torque restraint plane and then summing the weighted distances, and calculating the control torque that allows the drive constraint to be satisfied and the evaluation function to be minimized.

9. A non-transitory computer-readable recording medium storing a program, the program causing a computer for controlling, for orbital transfer toward a geostationary orbit, an orbit and an attitude of a satellite including a solar array panel and an attitude control actuator to function as:

an ideal thrust axis direction calculator to calculate, during the orbital transfer of the satellite toward the geostationary orbit, an ideal thrust axis direction based on information of a predetermined orbit of the satellite;

an ideal attitude calculator to calculate, during the orbital transfer of the satellite toward the geostationary orbit, an ideal attitude of the satellite based on the ideal thrust axis direction and a solar direction; and a control torque calculator to calculate, during the orbital transfer of the satellite toward the geostationary orbit, a control torque to control the attitude control actuator based on an estimation attitude of the satellite, the solar direction, a drive constraint of the attitude control actuator, and the ideal attitude, wherein the control torque calculator calculates an ideal control torque that makes the attitude of the satellite follow the ideal attitude and a torque restraint plane in which the solar direction is orthogonal to a rotational axis of the solar array panel, defines an evaluation function obtained by weighting a distance from the ideal control torque and a distance from the torque restraint plane and then summing the weighted distances, and calculates the control torque that allows the drive constraint to be satisfied and the evaluation function to be minimized.

10. The orbital attitude control device according to claim 2, wherein the satellite further includes an electric propulsion thruster to be driven by electric power generated by the solar array panel, and the processing circuitry controls propulsion of the electric propulsion thruster during the orbital transfer of the satellite toward the geostationary orbit.

11. The orbital attitude control device according to claim 2, wherein the estimation attitude information includes an estimation attitude angle and an estimation attitude angular velocity, and the ideal attitude information includes an ideal attitude angle and an ideal attitude angular velocity.

12. The orbital attitude control device according to claim 3, wherein the estimation attitude information includes an estimation attitude angle and an estimation attitude angular velocity, and the ideal attitude information includes an ideal attitude angle and an ideal attitude angular velocity.

13. The orbital attitude control device according to claim 2, wherein the drive constraint includes a constraint of an angular momentum and a constraint of a torque of the attitude control actuator.

14. The orbital attitude control device according to claim 3, wherein the drive constraint includes a constraint of an angular momentum and a constraint of a torque of the attitude control actuator.

15. The orbital attitude control device according to claim 4, wherein the drive constraint includes a constraint of an angular momentum and a constraint of a torque of the attitude control actuator.

16. The orbital attitude control device according to claim 2, wherein the processing circuitry calculates a feedforward control torque of a future time based on information of the orbit and the estimation attitude information, calculates a feedback control torque that makes the attitude of the satellite follow a reference attitude of the future time, the reference attitude being obtained by addition of the feedforward control torque to a model of the satellite, and controls the attitude control actuator by 2 degrees of freedom control that uses both of the feedforward control torque and the feedback control torque.

17. The orbital attitude control device according to claim 3, wherein the processing circuitry calculates a feedforward control torque of a future time based on information of the orbit and the estimation attitude information, calculates a feedback control torque that makes the attitude of the satellite follow a reference attitude of the future time, the reference attitude being obtained by addition of the feedforward control torque to a model of the satellite, and controls the attitude control actuator by 2 degrees of freedom control that uses both of the feedforward control torque and the feedback control torque.

18. The orbital attitude control device according to claim 4, wherein the processing circuitry calculates a feedforward control torque of a future time based on information of the orbit and the estimation attitude information, calculates a feedback control torque that makes the attitude of the satellite follow a reference attitude of the future time, the reference attitude being obtained by addition of the feedforward control torque to a model of the satellite, and controls the attitude control actuator by 2 degrees of freedom control that uses both of the feedforward control torque and the feedback control torque.

19. The orbital attitude control device according to claim 5, wherein the processing circuitry calculates a feedforward control torque of a future time based on information of the orbit and the estimation attitude information, calculates a feedback control torque that makes the attitude of the satellite follow a reference attitude of the future time, the reference attitude being obtained by addition of the feedforward control torque to a model of the satellite, and controls the attitude control actuator by 2 degrees of freedom control that uses both of the feedforward control torque and the feedback control torque.

20. A satellite comprising the orbital attitude control device according to claim 2.

* * * * *